United States Patent [19]
Daitoku et al.

[11] 4,371,244
[45] Feb. 1, 1983

[54] APPARATUS FOR CONTROLLING FILM ADVANCEMENT IN A CAMERA

[75] Inventors: Koichi Daitoku, Sagamihara; Kenji Sekine; Nobuo Matsukawa, both of Kawasaki; Shiro Sugimori, Sagamihara, all of Japan

[73] Assignee: Nippon Kogaku K.K., Tokyo, Japan

[21] Appl. No.: 230,015

[22] Filed: Jan. 30, 1981

[30] Foreign Application Priority Data

Feb. 5, 1980 [JP] Japan .................................. 55-12681

[51] Int. Cl.³ .............................................. G03B 1/18
[52] U.S. Cl. .................................. 354/173; 354/214; 354/217
[58] Field of Search ............... 354/173, 202, 203, 212, 354/213, 214, 217, 218

[56] References Cited

U.S. PATENT DOCUMENTS

| | | | |
|---|---|---|---|
| 3,479,940 | 11/1969 | Nerwin | 354/214 |
| 3,783,762 | 1/1974 | Sugimori | 95/31 |
| 3,994,003 | 11/1976 | Iwashita et al. | 354/214 |
| 4,135,801 | 1/1979 | Sunouchi et al. | 354/214 |
| 4,145,011 | 3/1979 | Date | 354/214 |

*Primary Examiner*—Russell E. Adams
*Attorney, Agent, or Firm*—Shapiro and Shapiro

[57] ABSTRACT

In a camera having a film transport mechanism for advancing and rewinding film and a counter for counting the number of frames of film advanced, a first control device operatively coupled to the counter controls the transport mechanism so as to prevent further film advancement upon the counter reaching a predetermined count. Upon the transport mechanism being operated to rewind the film, a second control device automatically disables the first control device so as to enable further film advancement by the transport mechanism.

9 Claims, 6 Drawing Figures

APPARATUS FOR CONTROLLING FILM ADVANCEMENT IN A CAMERA

BACKGROUND OF THE INVENTION

1. Field of the Invention

This invention relates to a film counter device for a camera, and more particularly to a film counter device which is operatively associated with film advance and rewinding operations in a camera using a roll of film and which is capable of restraining the film advance subsequent to the time when photography of any desired number of frames has been accomplished.

2. Description of the Prior Art

A film wind-up device for a camera using a film roll is known which is designed such that when advancement of the whole roll of a predetermined length of film is completed by photography, an increase in the tension of the film caused between the end of the film fixed to a film magazine and the wind-up device is detected and the operation of the wind-up device is restrained. However, a drop in temperature may cause film to become hardened and damaged causing a malfunction. Therefore, to prevent this, there is known a film rewind device provided with a film counter device which sets in advance an allowed number of exposure frames of the film loaded into a camera and which automatically stops operating when exposure of the set number of frames has been accomplished. This device is particularly effective for a wind-up device capable of effecting wind-up drive with the aid of an electric motor and is widely used.

Such a conventional device has been such that since the operation of the wind-up device is restrained by the counter device at the point of time whereat the scheduled photography of the film loaded into the camera has been accomplished, wind-up of a new roll of film loaded into the camera cannot be effected unless the counter device is again reset.

SUMMARY OF THE INVENTION

It is an object of the present invention to provide a film counter device which stops the operation of the film wind-up device upon photographing of a preset number of frames and which permits the operation of the film wind-up device during photography using a newly loaded film.

The invention will become fully apparent from the following detailed description thereof taken in conjunction with the accompanying drawings.

DESCRIPTION OF THE PREFERRED EMBODIMENTS

Figure 1:
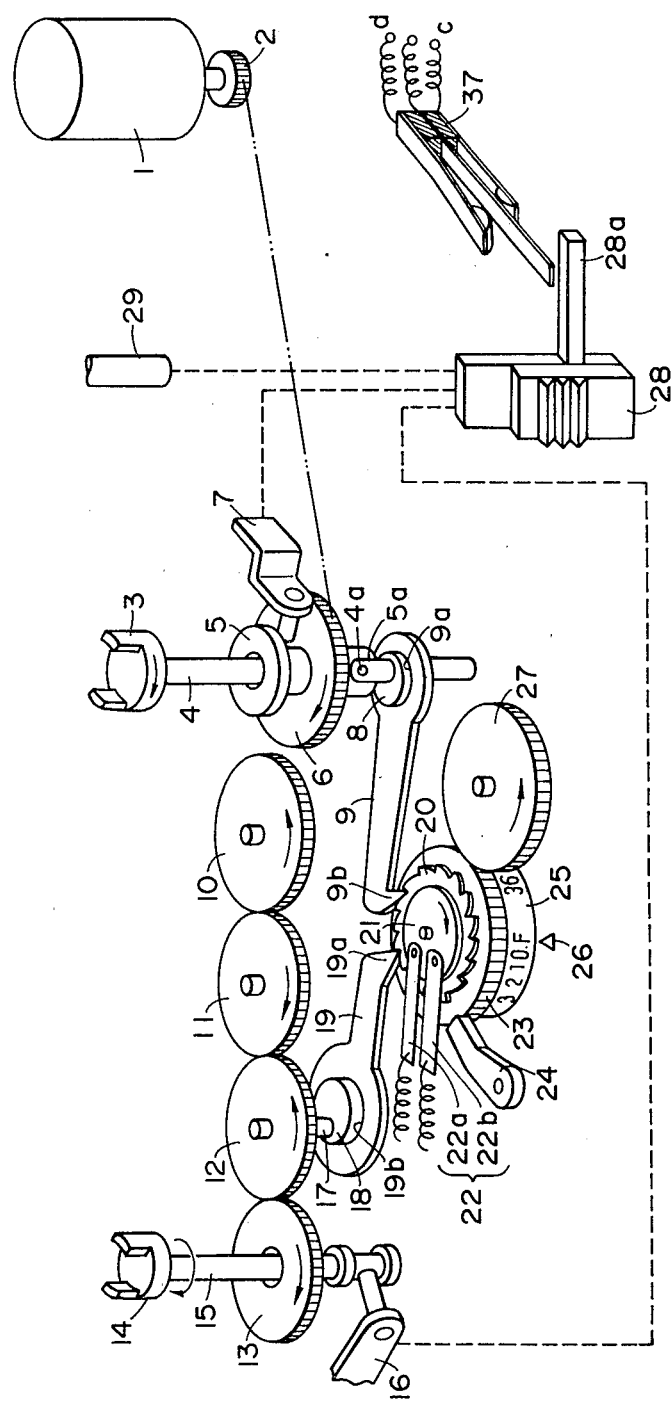
FIG. 1 is a perspective view of the device according to an embodiment of the present invention.

An embodiment of the present invention will hereinafter be described by reference to the drawings. In FIG. 1, reference numeral 1 designates a motor and reference numeral 2 denotes a pinion gear. Designated by 3 is a wind-up coupling connected to a wind-up mechanism (not shown) of a camera body and secured to a shaft 4. A slide ring 5 is slidable axially on the shaft 4, and a grooved portion 5a is engageable and disengageable with a pin 4a on the shaft 4. A gear 6 is integrally formed with the slide ring 5 and coupled to the gear 2 through a gear train, not shown. A lever 7 is provided to cause the slide ring 5 to slide. A disc-like eccentric cam 8 is secured to the shaft 4. A wind-up feed pawl 9 having a pawl portion 9b has a hole 9a therein into which the eccentric cam 8 is fitted. Accordingly, the wind-up feed pawl 9 is moved to left and right, as viewed in FIG. 1, by the eccentric cam 8 during rotation of the shaft 4.

Designated by 10, 11, 12 and 13 is a rewinding gear train. A shaft 15 having a rewind coupling 14 provided on the upper end thereof is adapted to rotate with the gear 13 and is slidable axially relative to the gear 13. The rewind coupling 14 is engageable with the spool of a film roll magazine (not shown) disposed within the camera body, and a lever 16 for causing the shaft 15 to slide for that purpose is provided. A disc-like eccentric cam 18 is secured to the lower end of a shaft 17 which is rotatable with the gear 12. A rewind feed pawl 19 having a pawl portion 19a has a hole 19b therein into which the eccentric cam 18 is fitted. Accordingly, the rewind feed pawl 19, like the wind-up feed pawl 9, is also moved to left and right, as viewed in FIG. 1, upon rotation of the gear 12.

Figure 3A:
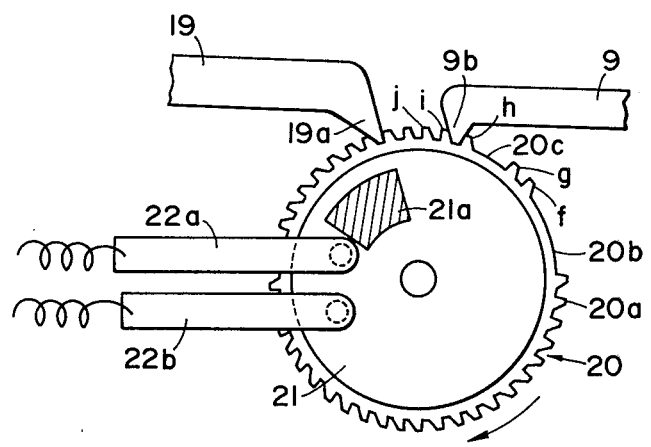
FIGS. 3A–3D are partial enlarged plan views for illustrating the operation of the device of FIG. 1.

The pawl portions 9b and 19a of the wind-up feed pawl 9 and the rewind feed pawl 19 are urged against a ratchet wheel 20 by a biasing member, not shown. The ratchet wheel 20, as clearly shown in FIG. 3A, has two cut-away portions 20b and 20c formed by partly cutting away a toothed portion 20a. On the ratchet wheel 20, there is formed a printed plate 21 having a conductor portion 21a thereon. A switch 22 is constituted by contact pieces 22a and 22b which are capable of contacting the conductor portion 21a. A reverse rotation stopping pawl 24 is urged against a gear 23 rotatable with the ratchet wheel 20, by a biasing member, not shown. A frame-number indicating plate 25 is rotatable with the ratchet wheel 20 and the gear 23. An index mark 26 is fixed to a motor drive device. Designated by 27 is a counter set dial which is in mesh engagement with the gear 23. This dial 27 is partly projected from the motor drive device so as to be externally operable. An operating member 28, by its upward sliding operation, operates the levers 7 and 16, a switch 37 to be later described, and a button 29 for operating a clutch mechanism for releasing the connection between the wind-up mechanism of the camera and a film feeding sprocket.

Figure 2:
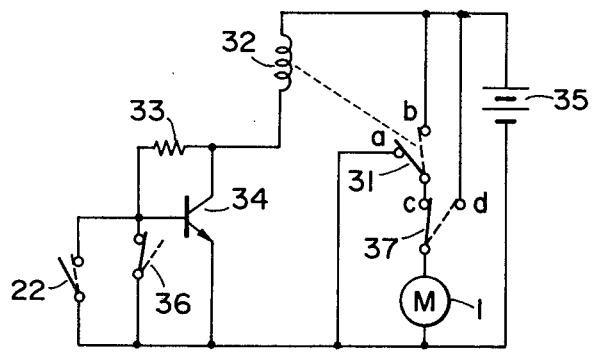
FIG. 2 is a diagram of the electric circuit in this embodiment.

An electric circuit of the device is diagrammatically shown in FIG. 2. Two change-over switches 31 and 37 are connected between the motor 1 and a power source 35. The switch 31 is a relay switch which is normally connected to a terminal a and controlled by a coil 32, and the switch 37 is operatively associated with the rewind operating member of FIG. 1. The control of the coil 32 is accomplished by a transistor 34 biased by a resistor 33 and driven by switches 22 and 36 parallel-connected between the base and emitter of the transistor. The switch 22 is the switch 22 on the counter of FIG. 1. Switch 36 is adapted to be opened upon completion of the exposure operation by the shutter device of the camera body and to be closed upon completion of the advance of one film frame by the wind-up device, and operates in response to a signal from the camera body.

The operation of the present embodiment will now be described. In a condition in which normal photography is effected, the motor drive device assumes such a position as shown in FIGS. 1, 2 and 3D when film advancement has been completed. The device according to the present embodiment enables stoppage of the automatic operation of the motor drive device for a desired number of photographed frames. Description will first be made of the operation in this case.

When the photographer turns the counter set dial 27 counter-clockwise, as viewed in FIG. 1, from the position of FIG. 1 which shows the film advancement completed condition, the gear 23 is rotated clockwise. For example, when the photographer loads a 36-frame film roll into the camera and desires to automatically stop the motor drive device at a point of time whereat advancement of 36 frames has been completed, the photographer operates the dial 27 to thereby register the number "36" on the frame number indicating plate 25 next to the index mark 26. This operation will be described by reference to FIGS. 3D and 3A.

By the operation of the dial 27, the ratchet wheel 20 is rotated clockwise from the position of FIG. 3D, so that the teeth portion 9b clears the cut-away portion 20b, pawls f and g and cut-away portion 20C, and comes into mesh engagement with a tooth h. In this condition, the aforementioned registration between the index mark 26 and the number "36" is accomplished. Reverse rotation of the dial 27 is prevented by the action of the reverse rotation stopping pawl 24 acting on the ratchet wheel 20, gear 23 and indicating plate 25. When a shutter button, not shown, is depressed after a desired number of photographed frames has been so set, the shutter mechanism of the camera moves to effect an exposure operation and, upon termination of the exposure, the switch 36 opens from the position of FIG. 2 and the transistor 34 is turned on. The switch 31 is caused to change over from the terminal a to the terminal b by the relay coil 32 and the motor 1 starts to rotate. The rotation of the motor 1 is transmitted to the wind-up coupling 3 through the gear 6, the engagement between the grooved portion 5a and the pin 4a, and the shaft 4. By the rotation of the coupling 3, the wind-up mechanism is driven to effect wind-up operations such as shutter charge, film advance, etc. When the film is advanced by an amount corresponding to one frame, the switch 36 returns to its ON position and the transistor 34 is turned off and the relay switch 31 changes from the terminal b to the terminal a, so that the motor 1 stops rotating. The wind-up coupling 3 is designed to make one full rotation when one film frame is advancement and, during this advance of one film frame, the wind-up feed pawl 9 also effects one reciprocal movement to the left and right in FIGS. 1 and 3A. With the initiation of wind-up, the wind-up feed pawl 9 first moves to the right as viewed in the drawings and the pawl portion 9b comes into engagement with the tooth h to rotate the ratchet wheel 20 clockwise by an amount corresponding to one tooth. Thereafter, as the rotation of the wind-up coupling 3 progresses, the wind-up feed pawl 9 moves to the left as viewed in the drawing and the pawl portion 9b clears the tooth i and drops into the space between the teeth i an j, thus completing one full rotation of the wind-up coupling 3. When the pawl portion 9b moves to left as viewed in the drawings and clears the tooth i, the rotation of the ratchet wheel 20 is restrained by the reverse rotation stopping pawl 24. In this manner, one film frame is advanced and the ratchet wheel 20 is rotated by an amount corresponding to one tooth, whereupon the number "35" on the frame number indicating plate 25 comes into registration with the index mark 26. Thereafter, when the shutter button continues to be depressed to effect continuous photography, the wind-up operation and the exposure operation are alternately repeated as described above and the number which comes into register with the index mark 26 is decremented as "34, 33, 32, . . . ". At this time, the rewind feed pawl 19 does not prevent clockwise rotation of the ratchet wheel 20.

Figure 3B:
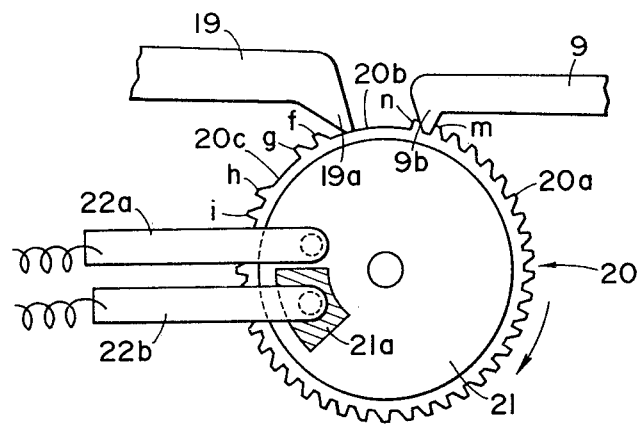
Figure 3C:
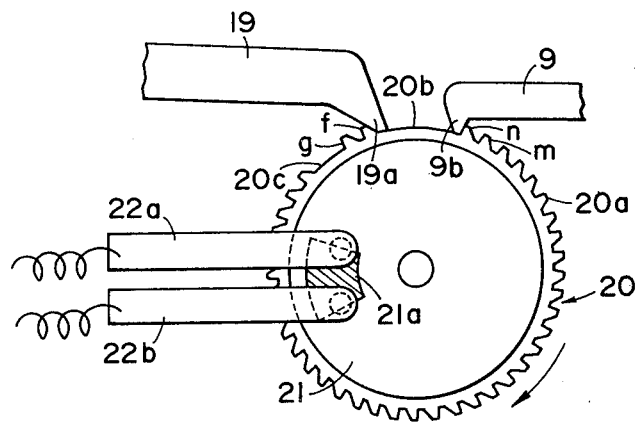
Figure 3D:
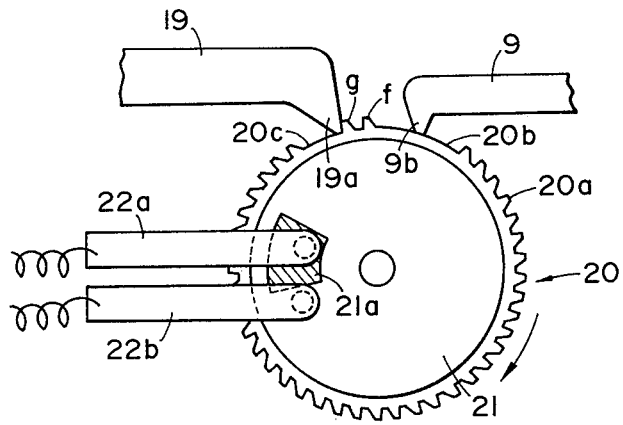

The condition in which the photography has progressed until the number "1" on the frame number indicating plate 25 comes into registration with the index mark 26 is shown in FIG. 3B. When, in this condition, the wind-up coupling 3 is driven, the wind-up feed pawl 9 is moved to the right as viewed in the drawings and the pawl portion 9b comes into engagement with the tooth m to rotate the ratchet wheel 20 clockwise by an amount corresponding to one tooth. Thereafter, when the wind-up feed pawl 9 is moved to the left as viewed in the drawings, the pawl portion 9b clears the tooth n. Thus, the position of FIG. 3C is brought about. In this position, the number "0" on the frame number indicating plate 25 is in registration with the index mark 26. The switch 22 of the counter remains in OFF position when the position of FIG. 3B is brought about, but after the position of the device has shifted to the position of FIG. 3C, as is apparent from the drawings, both the contact pieces 22a and 22b are positioned on the conductor portion 21a and thus, the switch 22 assumes its ON position. Accordingly, thereafter, even if the switch 36 assumes its OFF position with the exposure operation, the transistor 34 remains non-conductive and the switch 31 remains connected to the terminal a and thus, the motor 1 does not start to rotate. Thus, when the number "0" on the frame number indicating plate 25 comes into registration with the index mark 26, the driving of the motor 1 is automatically stopped so that the wind-up operation can no longer take place.

Description will now be made of a case where film rewinding is effected from the condition of FIG. 3C. When a rewind operating member 28 is operated, the lever 7 is moved upwardly from its position of FIG. 1 at a first stage and the slide ring 5 slides upwardly on the shaft 4. The grooved portion 5a comes out of engagement with the pin 4a and the gear 6 comes into mesh engagement with the gear 10. At a second stage of the operation of the rewind operating member 28, the connection between the wind-up mechanism within the camera body and the sprocket is released to render the sprocket free. Further, at a third stage of the operation, the switch 37 is changed over from a terminal c to a terminal d by the arm 28a of the operating member 28 to thereby drive the motor 1. At the final stage of the operation of the rewind operating member, the lever 16 is moved upwardly and the rewind coupling 14 and shaft 15 slide upwardly, and the rewind coupling 14 comes into engagement with the spool of the film magazine in the camera body. By this operation, the rotation of the motor 1 is transmitted to the shaft 15 through the gears 2, 6, 10, 11, 12 and 13 and the rewind coupling 14 is rotated clockwise as viewed in FIG. 1, so that the exposed film is rewound into the film magazine. Of course, at this time, the rotation is not transmitted to the wind-up coupling 3. By counterclockwise rotation of the gear 12 during the rewinding, the eccentric cam 18 is also rotated and the rewind pawl 19 is also moved to the left and right as viewed in FIGS. 1 and 3C. The rewind feed pawl 19 moves to the left from its position shown with the start of rotation of the gear 12 and the pawl portion 19a clears the tooth f and drops into the space between the teeth f and g. As the rotation of the gear 12 progresses, the rewind feed pawl 19 moves to the right as viewed in the drawings and the pawl portion 19a thereof pushes the tooth f, thus rotating the ratchet wheel 20 clockwise as viewed in the drawings by an amount corresponding to one tooth. When the rewind feed pawl 19 rotates the ratchet wheel 20 by an amount corresponding to two teeth, there is brought about the position of FIG. 3D. During the film rewinding, the rewind feed pawl 19 repeats its back and forth movement, but when the pawl portion 19a becomes positioned at the cut-away portion 20c, the ratchet wheel 20 maintains its position of FIG. 3D. The character "F" on the frame number indicating plate 25 comes into registration with the index mark 26. In this condition, the pawl portion 9b of the wind-up feed pawl 9 is positioned at the cut-away portion 20b. Further, the conductor portion 21a is also rotated clockwise from its position of FIG. 3C, so that the switch 22 is open. Thus, the rewind operation is completed.

When the rewind operating member 28 is returned to its initial position, the switch 37 changes over from the terminal d to the terminal c. By the return of the rewind operating member to its initial position, there is brought about the position of FIGS. 1 and 3D. If the switch 31 is connected to the terminal a during the return of the rewind operating member, the motor 1 will not be driven and the circuit condition of FIG. 2 will be brought about, but if the switch 31 is connected to the terminal b, the motor 1 will be driven. However, upon completion of the rewinding, the film is disengaged from the sprocket which effects film advance and therefore, even if the wind-up coupling 3 is rotated by the motor 1, the film will not be wound up and the circuit will assume its position of FIG. 2.

Description will now be made of a case where normal photography is effected, namely, a case where photography of a predetermined number of frames is not set by the counter set dial 27. When photography is effected in the condition of FIGS. 1, 2 or 3D, the wind-up coupling 3 is rotated by the aforementioned operation to effect a wind-up operation. Even if the wind-up feed pawl 9 effects its back and forth movement by virtue of the rotation of the shaft 4, the pawl portion 9b will remain at the cut-away portion 20b as shown in FIG. 3D and will not rotate the ratchet wheel 20. In this manner, the wind-up operation is effected without the ratchet wheel 20 and the frame number indicating plate 25 being driven. In a manner similar to that described above, the wind-up operation and the exposure operation are alternately repeated to complete the photography of a number of frames of film which can be photographed. During that time, the ratchet wheel 20 is maintained in its position of FIG. 3D.

Again in the case of the film rewind operation after completion of photography, the rewind coupling 14 is driven by the motor 1 but the ratchet wheel 20 and the frame number indicating plate 25 are not driven.

As is apparent from this embodiment, in the device of the present invention, even if the rewinding operation is effected from either a condition in which one frame advance operation and shutter release operation have been completed or a condition in which such operations have not been completed, the position of FIGS. 1 and 2 will be restored whenever the rewind operating member is returned to its initial position.

While the foregoing description has been made with respect to a case where the motor drive device is removably mountable to the camera body, even a case where the motor drive device is contained within the camera body does not depart from the scope of the present invention.

Further, the present embodiment has been described with respect to a case where the counter device of the present invention has been applied to the motor drive device. Alternatively, the counter device of the present invention may be provided within the camera body and the back and forth movement of the wind-up feed pawl 9 may be directly effected by a manual wind-up operation of a film advance lever and the back and forth movement of the rewind feed pawl 19 may be directly effected by a manual rewinding operation of a rewind knob. In that case, the elements 1–7 and 10–16 would be unnecessary.

As a further alternative, the counter may be constituted by a display element including 7 segments of LED and a device for driving the same so that a predetermined number of frames may be set by this counter and the displayed value of this counter may be decremented with wind-up until the number becomes "0". A condition in which no wind-up is possible may thus be automatically brought about, and the display of the counter may be turned off by a rewinding operation or the like so that wind-up may become possible independently of the counter.

We claim:

1. In a camera having a film transport mechanism for advancing film frame-by-frame and for rewinding advanced film, and having a counter operable in response to the advancement of the film for counting the number of frames advanced by the transport mechanism, the improvement comprising first control means responsive to the counter reaching a predetermined count for controlling the transport mechanism so as to prevent further advancement of the film, and second control means responsive to the transport mechanism effecting a rewind operation to rewind the film for automatically disabling the first control means so as to enable further film advancement by the transport mechanism.

2. The camera of claim 1, wherein said second control means includes means for disabling said counter to prevent further counting of film advancement by the counter and for maintaining said first control means disabled until the counter is reset by an operator.

3. The camera of claim 1, wherein said first control means is effective to prevent film advancement by the transport mechanism as long as the counter is at a counting position corresponding to said predetermined count, and wherein said second control means includes means for operating the counter upon said rewind operation being effected so as to cause the counter to assume a counting position other than said predetermined count.

4. The camera of claim 1 further comprising means for setting the counter to count a number of frames corresponding to said predetermined count, said setting means being operable to cause the first control means to assume a condition in which it does not prevent advancement of the film by the transport mechanism.

5. The camera of claim 4, wherein the film transport mechanism comprises an electrical motor and means for alternatively coupling the motor to a wind-up mechanism for advancing the film and to a rewind mechanism for rewinding the film, and wherein said first control means comprises a power controlling switch having a preventing position that prevents power from being applied to the motor, the switch being in said preventing position upon the counter being at said predetermined count, and wherein said control means comprises means operable upon the film being rewound for causing said power controlling switch to assume a non-preventing position.

6. The camera of claim 1, wherein the counter comprises a ratchet wheel and a pawl engaging the ratchet wheel for rotating the ratchet wheel a predetermined amount for each frame of film advanced by the transport mechanism, the ratchet wheel having a missing tooth portion adapted to be positioned adjacent to the pawl upon the ratchet wheel assuming a predetermined position corresponding to said predetermined count to prevent further rotation of the ratchet wheel by said pawl, the first control means being responsive to the ratchet wheel assuming said predetermined position for preventing said further advancement of film.

7. The camera of claim 6, wherein said second control means comprises another pawl for rotating the ratchet wheel to another predetermined position upon a rewind operation being effected by the transport mechanism, said missing tooth portion being sized such that upon rotation of the ratchet wheel to said other predetermined position said missing tooth portion remains positioned adjacent to the first-mentioned pawl, so that said first-mentioned pawl is incapable of rotating said ratchet wheel during further advancement of the film.

8. In a camera having a film transport mechanism for effecting a wind-up operation for advancing film frame-by-frame and a rewind operation for rewinding the advanced film, a device for controlling said wind-up operation comprising counter means, means for driving the counter means in response to the advancement of film to count the number of frames of film advanced, means responsive to the counter means reaching a predetermined count for blocking the wind-up operation of the film transport mechanism to prevent further advancement of film, means responsive to a rewind operation for automatically releasing the blocking of the transport mechanism by the blocking means, and means responsive to said rewind operation for disabling the counter driving means during subsequent film advancement.

9. In a camera having a film transport mechanism for effecting a wind-up operation for advancing film frame-by-frame and a rewind operation for rewinding the film, a device for controlling the wind-up operation comprising first means displaceable in response to a wind-up operation being effected by the transport mechanism, the amount of displacement of said first means corresponding to the number of frames of film advanced by the transport mechanism, the first means having a first condition, corresponding to a range of displacements, at which the first means enables the transport mechanism to effect a wind-up operation for advancing film, a second condition, corresponding to a predetermined displacement, at which the first means prevents the transport mechanism from effecting a wind-up operation, and a third condition, corresponding to another predetermined displacement, at which the transport mechanism is enabled to effect a wind-up operation and at which further displacement of the first means is prevented, and second means responsive to a rewind operation being effected by the transport mechanism for automatically causing the first means to assume said third condition.

* * * * *